US010473048B2

(12) United States Patent
Moorcroft

(10) Patent No.: US 10,473,048 B2
(45) Date of Patent: Nov. 12, 2019

(54) VEHICLE CONTROL UNIT

(71) Applicant: JAGUAR LAND ROVER LIMITED, Warwickshire (GB)

(72) Inventor: Adam Moorcroft, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/558,594

(22) PCT Filed: Mar. 17, 2016

(86) PCT No.: PCT/EP2016/055798
§ 371 (c)(1),
(2) Date: Sep. 15, 2017

(87) PCT Pub. No.: WO2016/146740
PCT Pub. Date: Sep. 22, 2016

(65) Prior Publication Data
US 2018/0080402 A1 Mar. 22, 2018

(30) Foreign Application Priority Data
Mar. 18, 2015 (GB) .................... 1504597.4

(51) Int. Cl.
*F02D 41/00* (2006.01)
*F02D 41/06* (2006.01)
(Continued)

(52) U.S. Cl.
CPC ....... *F02D 41/062* (2013.01); *B60W 50/0098* (2013.01); *F01N 1/168* (2013.01);
(Continued)

(58) Field of Classification Search
CPC .... F02D 41/062; F02D 41/061; F02D 41/064; F02D 41/065; F02N 11/08; F02M 35/1294; F01N 1/168; G10K 15/02
See application file for complete search history.

(56) References Cited

U.S. PATENT DOCUMENTS 2,492,784 A * 12/1949 Christman .............. F01N 1/165
181/236
5,495,127 A * 2/1996 Aota ...................... B60K 6/485
290/31
(Continued)

FOREIGN PATENT DOCUMENTS

| DE | 10 2008 002701 A1 | 12/2009 |
| DE | 10 2011 112179 A1 | 3/2012 |
| DE | 10 2014 203401 A1 | 8/2015 |

OTHER PUBLICATIONS

International Search Report and Written Opinion of the International Searching Authority for International application No. PCT/EP2016/055798 dated Jul. 12, 2016.
(Continued)

*Primary Examiner* — Hieu T Vo
*Assistant Examiner* — Sherman D Manley
(74) *Attorney, Agent, or Firm* — Carlson, Gaskey & Olds

(57) ABSTRACT

The present invention relates to a vehicle control unit (20). The vehicle control unit (20) comprises an input (26) for detecting a start demand and a driving condition. The vehicle control module also comprises a control module (28) arranged to control an engine start attribute according to a first profile (34) and a second profile (36). The vehicle control module (20) also comprises a selection module (30) arranged to select between the first and second profiles (34, 36) based on detecting a predetermined driving condition, in response to detecting a start demand.

21 Claims, 6 Drawing Sheets

(51) Int. Cl.
    *F02D 41/24*     (2006.01)
    *F02P 5/15*     (2006.01)
    *F01N 1/16*     (2006.01)
    *F02D 31/00*     (2006.01)
    *G10K 15/02*     (2006.01)
    *B60W 50/00*     (2006.01)
    *F02M 35/12*     (2006.01)
    *F02N 11/08*     (2006.01)

(52) U.S. Cl.
    CPC ....... *F02D 31/001* (2013.01); *F02D 41/0002* (2013.01); *F02D 41/2422* (2013.01); *F02M 35/1294* (2013.01); *F02N 11/08* (2013.01); *F02P 5/1502* (2013.01); *G10K 15/02* (2013.01); *F02D 2041/001* (2013.01); *F02D 2200/60* (2013.01); *F02D 2200/602* (2013.01); *F02D 2200/604* (2013.01); *F02D 2200/606* (2013.01); *F02D 2200/70* (2013.01); *F02D 2200/701* (2013.01); *F02N 2200/105* (2013.01); *F02N 2300/2002* (2013.01); *Y02T 10/46* (2013.01)

(56) References Cited

U.S. PATENT DOCUMENTS

| | | | | |
|---|---|---|---|---|
| 6,598,390 | B2 * | 7/2003 | Chang | F01N 1/006 181/227 |
| 6,612,386 | B2 * | 9/2003 | Tamai | B60K 6/48 180/65.25 |
| 6,957,636 | B2 * | 10/2005 | Kuribayashi | F02D 41/062 123/179.28 |
| 2003/0121720 | A1 * | 7/2003 | Chang | F01N 1/082 181/254 |
| 2003/0168041 | A1 * | 9/2003 | Kubo | F02D 11/105 123/339.11 |
| 2007/0157899 | A1 * | 7/2007 | Seufert | B60K 6/387 123/179.25 |
| 2007/0182525 | A1 * | 8/2007 | McCarthy | G10K 15/02 340/425.5 |
| 2008/0023264 | A1 * | 1/2008 | Pacini | F01N 1/165 181/237 |
| 2008/0078613 | A1 * | 4/2008 | Liu | F01N 1/16 181/237 |
| 2008/0129049 | A1 * | 6/2008 | Sauvlet | B60K 6/48 290/34 |
| 2009/0063028 | A1 * | 3/2009 | Aitchison | B60W 10/06 701/113 |
| 2011/0192368 | A1 * | 8/2011 | Becker | F02M 35/1294 123/184.21 |
| 2015/0045999 | A1 * | 2/2015 | Eich | F02D 41/062 701/22 |

OTHER PUBLICATIONS

Combined Search and Examination Report under Sections 17 and 18(3) for Application No. GB1504597.4 dated Sep. 4, 2015.
Combined Search and Examination Report under Sections 17 and 18(3) for Application No. GB1604524.7 dated Sep. 20, 2016.

* cited by examiner

VEHICLE CONTROL UNIT

TECHNICAL FIELD

The present disclosure relates to a vehicle control unit and particularly, but not exclusively, to a control unit for controlling vehicle attributes. Aspects of the invention relate to a vehicle control unit, a vehicle including the same and a method of controlling a vehicle start attribute.

BACKGROUND

A vehicle includes an engine which is associated with an engine idle speed after starting. At engine start, the engine is controlled according to a predefined attribute before settling at the idle speed. The attribute can be pre-set, prior to delivery to the end user, so as to achieve a desired effect on the end user.

One known attribute is known as a "sporty" attribute, or profile, which aims to maximise engine noise at engine start. This is achieved by including an overshoot in engine speed, known as an engine flare, prior to idle speed. In response to a start demand from a driver of the vehicle, the engine flares creating increased noise than would ordinarily be expected at engine start. Some drivers are keen on such a "sporty" attribute whilst other drivers may find the "sporty" attribute disconcerting.

In contrast, another known attribute is known as a "refined" attribute, or profile. The "refined" profile includes a lower magnitude of engine flare prior to idle than the "sporty" attribute. As a result, less engine noise is associated with the "refined" attribute compared with the "sporty" attribute. The "refined" attribute may be more appealing to certain consumers or certain vehicle models.

It is an object of the present invention to further improve on the prior art.

SUMMARY OF THE INVENTION

According to an aspect of the present invention there is provided a vehicle control unit. The control unit may comprise an input for detecting a start and a driving condition; The control unit may comprise a control module arranged to control an engine start attribute according to a first profile and a second profile. The control unit may comprise a selection module arranged to select between the first and second profiles based on detecting a predetermined driving condition, in response to detecting a start demand.

By predetermined driving condition is meant any condition at engine start-up which the vehicle is currently in and can be used to decide whether the first profile or the second profile is more appropriate for a current driver or use scenario. The selection module allows for an appropriate engine start profile to be selected depending on the driving conditions.

In an embodiment, the first profile may be a "sporty" profile and the second profile may be a "refined" profile, the "sporty" profile including a higher magnitude of engine speed overshoot prior to idle than the "refined" profile.

In an embodiment, the "refined" profile may have a suppressed flare prior to idle speed. No flare minimises any engine noise prior to idle speed and provides for the quietest engine start attribute.

In an embodiment, the first profile and/or the second profile may be customisable by an end user. In this way, the end user can customise the start profiles according to their personal tastes and preferences.

In an embodiment, the vehicle control unit may comprise a noise control module to control a supplementary noise source of the vehicle to accentuate or attenuate the effect of the flare of the "sporty" and "refined" profiles. Accentuating or attenuating the effect of the flare using the supplementary noise source as opposed to further modifying the engine flare provides additional control and flexibility for the designer.

In an embodiment, the supplementary noise source may comprise an infotainment system comprising a speaker, the infotainment system may be arranged to emit additional noise in response to the "sporty" profile being selected and may be arranged to emit anti-noise in response to the "refined" profile being selected. Additional noise allows for a louder engine start than may be possible by modifying the engine flare alone. Anti-noise allows for a quieter engine start than may be possible by modifying the engine flare alone. Either way, the impact on the end user is enhanced by the infotainment system being used in this way.

In an embodiment, the supplementary noise source may comprise an exhaust system. The exhaust system is associated with noise in use so accentuating or attenuating the noise from the exhaust system is an easy and reliable way in which to impact the end user at engine start.

In an embodiment, the noise control module may be arranged to configure an active exhaust valve of the exhaust system to direct a relatively high proportion of exhaust gas to flow through a suppressor in response to selecting the "refined" profile, and to direct a relatively low proportion of exhaust gas to flow through the suppressor in response to selecting the "sporty" profile. The suppressor acts to suppress exhaust noise. A higher proportion of exhaust air flowing through the suppressor at engine start provides for a quieter exhaust system than lower proportion of exhaust air flowing through the suppressor at engine start.

In an embodiment, the noise control module may be arranged to configure one or more engine controllable elements to induce noise upstream through an induction system or downstream through an exhaust system, wherein said controllable elements are selected from the list of an engine intake valve, an engine exhaust valve, and a spark plug. In this way, sound effects such as "pops" and "bands" can be created which have a major impact on passers-by as well as vehicle occupants.

In an embodiment, the supplementary noise source may comprise an active intake system.

In an embodiment, the active intake system may comprise an active induction system.

In an embodiment, the active induction system may comprise a symposer for diverting induced airflow into two ducts each having different geometry to control the engine noise allowed to propagate from the engine. The supplementary noise source is thus indirectly linked to actual engine noise at engine start and so controlling the supplementary noise in this way is highly effective at accentuating or attenuating engine noise.

In an embodiment, the active intake system may comprise an active inlet manifold.

In an embodiment, the supplementary noise course comprises a tachometer. The tachometer can provide an artificial impression on the driver that, for instance, the engine speed perceived by the tachometer is different to the actual engine speed.

In an embodiment, the vehicle control unit of any preceding claim wherein the "sporty" profile is defined as a default profile, the selecting module arranged to over-ride the "sporty" profile with the "refined" profile. It would be less desirable to set the "refined" profile as the default profile to be over ridden by the "sporty" profile since such over-riding may startle a driver.

In an embodiment, the selecting module may be arranged to select the profile automatically in response to sensing the driving condition. Automatic selection reduces work load on the driver at engine start.

In an embodiment, the driving condition may include one of; a time of day, a date, driver identification, vehicle location, ambient noise, throttle pedal actuation profile. Setting the profile according to time or day, vehicle location, and ambient noise will likely result in the "sporty" profile only being selected when desirable for instance not late at night in a built up area with little or no ambient noise. The driver identification and throttle pedal actuation profile being used to set the profile would be more desirable for vehicles for which there is more than one driver.

In an embodiment, the vehicle control unit may comprise a profile selector and the driving condition may include a manual selection input by a vehicle occupant using the profile selector. Manually selecting the profile reduces the risk of the driver being surprised by the selected profile since the driver would have to actively select the desired profile rather than the vehicle determining the profile independently.

In an embodiment, the profile selector may include a touch screen.

According to a further aspect of the present invention there is provided a vehicle including the aforementioned vehicle control unit.

According to a further aspect of the present invention there is provided a method of controlling a vehicle attribute. The method may comprise monitoring a driving condition and a start demand. The method may comprise in response to detecting the start demand, configuring an engine speed at engine start according to first profile and a second profile. The method may comprise selecting between the first and second profiles in response to detecting a predetermined driving condition.

In an embodiment, the first profile may be a "sporty" profile and the second profile may be a "refined" profile, wherein the "sporty" profile includes an engine flare of higher magnitude than the "refined" profile prior to idle speed.

In an embodiment, the "refined" profile may have a suppressed flare prior to idle speed.

In an embodiment, the method may comprise controlling noise from a supplementary noise source of the vehicle.

In an embodiment, the method may comprise controlling a volume of an infotainment system to emit additional noise in response to the "sporty" profile being selected and emit anti-noise in response to the "refined" profile being selected.

In an embodiment, the method may comprise configuring an active exhaust valve of an exhaust system to direct a relatively high proportion of exhaust gas to flow through a suppressor in response to selecting the "refined" profile, and to direct a relatively low proportion of exhaust gas to flow through the suppressor in response to selecting the "sporty" profile.

In an embodiment, the method may comprise configuring a throttle plate and an exhaust valve of the engine to operate according to a Late Intake Valve Opening (LIVO) protocol to allow a tail end of a combustion cycle to occur within the Exhaust system.

In an embodiment, the vehicle control unit may comprise configuring an active intake system to control upstream propagation of engine noise.

In an embodiment, the vehicle control unit may comprise configuring a symposer of an active induction system to divert induced air between two ducts, each having a different geometry to control acoustic propagation of engine upstream.

In an embodiment, the "sporty" profile may be defined as a default profile, wherein the step of selecting the profile may include over-riding the "sporty" profile with the "refined" profile.

In an embodiment, the method may comprise automatically selecting the profile in response to detecting the driving condition.

In an embodiment, the driving condition may include one of; a time of day, a date, driver identification, vehicle location, ambient noise, and throttle pedal actuation profile.

In an embodiment, the driving condition may include a manual selection input by a vehicle occupant.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
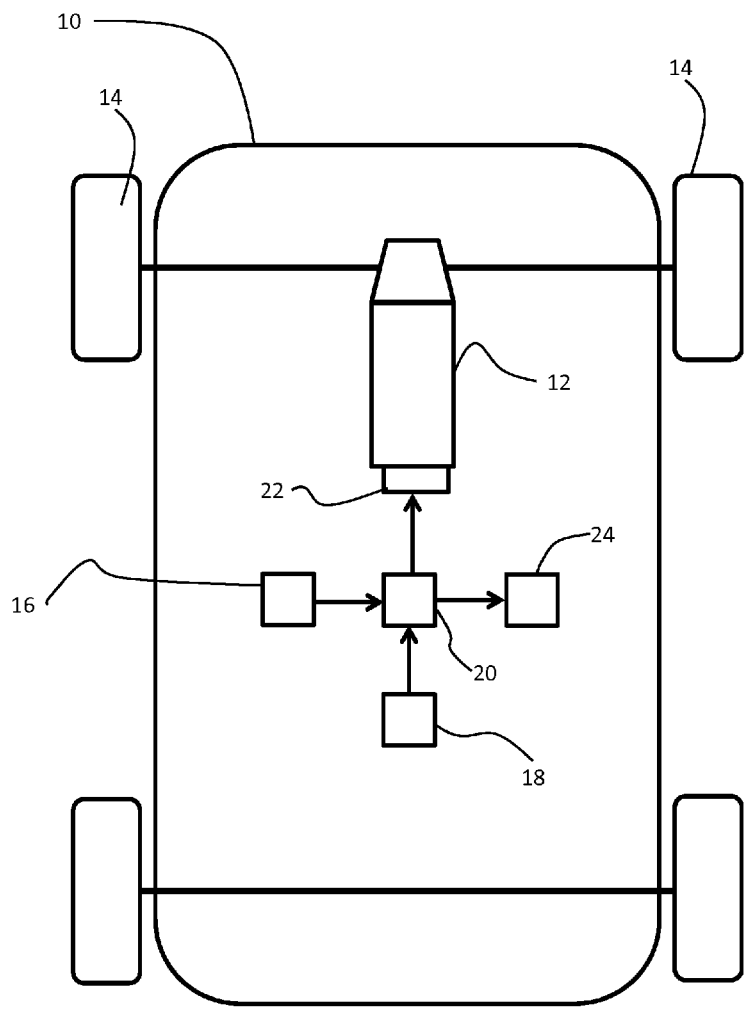
FIG. 1 shows a schematic view of a vehicle including a vehicle control unit according to an embodiment of the present invention.

With reference to FIG. 1, a vehicle 10, such as a car or other such land vehicle, includes a drive system. Broadly speaking, the drive system includes an engine 12 for supplying power to two or more wheels 14. The vehicle 10 also includes a plurality of sensors 16, a start switch 18, a vehicle control unit 20, and engine control unit 22 and a supplementary noise source 24.

The sensors are used for detecting various driving conditions. The driving conditions monitored by the sensors 16 include a time of day, a date, driver identification, vehicle location, ambient noise, throttle pedal actuation profile. Time of day can be monitored by an on-board clock.

Likewise the date can be monitored in a similar way by monitoring a calendar of the on-board vehicle. Driver identification can be monitored by a position sensor which detects the locality of a driver identification chip held by a driver or other vehicle occupant. The ambient noise can be monitored by a sensor in the form of a microphone. Throttle pedal actuation profile can be monitored by a potentiometer monitoring for positional changes in the throttle pedal position in a car where the throttle pedal is used as a start switch.

The start switch 18 can be the throttle pedal, as described above. Alternatively, the start switch can be in the form of a dashboard mounted push button, or a key.

Figure 2:
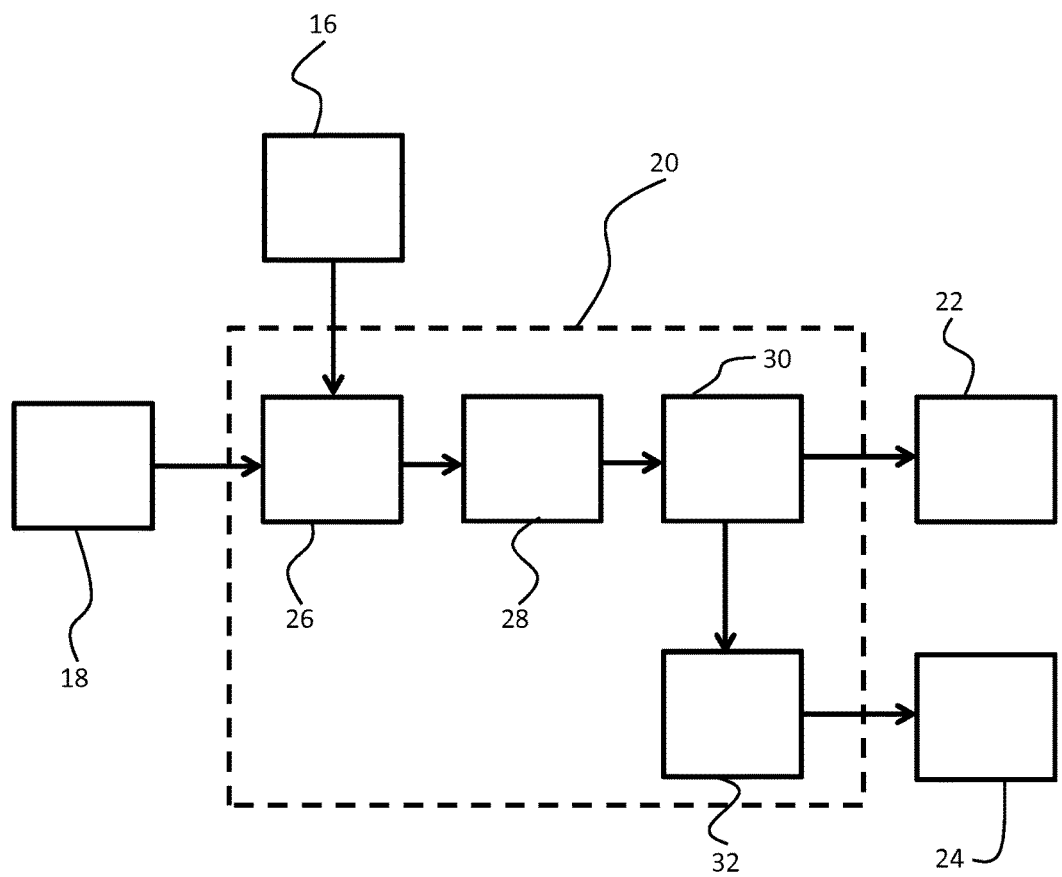
FIG. 2 shows a schematic of the vehicle control unit from FIG. 1.

With reference to FIG. 2, the vehicle control unit 20 includes an input 26, a control module 28, a selection module 30 and a noise control module 32. The input 26 is connected to the sensors 16 and the start switch 18 to monitor for driving conditions and ignition demands respectively. Each of the aforementioned modules 28-32 are provided in the form of electronic data store on a non-volatile memory component of the control module 28, which in this case is in the form of an on-board computer. The control module 28 also includes a processor to execute the electronic data store in the memory component in response to the input receiving the various driving conditions and ignition demands.

The control module 28 includes a look-up table including various engine start attributes. Amongst the attributes stored in the look-up table include a "sporty" profile and a "refined" profile. The characteristics of both of these profiles will be described in more detail below together with an explanation as to how they are realised. However, the look-up table may include customisable attributes which an end user can use to input a customised engine start profile according to their personal tastes and preferences.

The control module 28 feeds into the selection module 30. The selection module 30 selects which engine start attribute to select in response to the input 26 detecting a start demand. The selection module 30 is able to select the appropriate attribute automatically based on the various vehicle conditions in order to make the selection. Alternatively, one of the sensors 16 can include a profile selector in the form of a dashboard switch or a touchscreen panel where a vehicle occupant is able to select manually which attribute is appropriate. In this way, the "sporty" profile is the default profile unless over-ridden by the demand for the "refined" profile. This convention is most desirable, especially with regard to automatic attribute selection, so that a driver is not startled by an unexpected "sporty" profile being selected at ignition. Alternatively, in some but not necessarily all examples, the profile selected at the last vehicle ignition is selected as the default profile unless over-ridden by manual selection by the vehicle occupant.

In some but not necessarily all example of the present disclosure the correspondence between the various vehicle conditions and an engine start attribute that enables the selection module 30 to automatically select the appropriate attribute based on the various vehicle conditions is customisable by the end user. For example, the end user may program a time of day range (e.g., 11 pm to 7 am) that corresponds to an engine start attribute.

Once the profile has been selected, the engine control unit 22 is configured to control various controllable parts of the engine 12 to operate according to the selected profile. The controllable parts of particular interest include a throttle plate, air intake valves, and exhaust valves of the cylinders, as well as fuel and injection angle. The throttle plate is located upstream of the engine and controls the flow rate of air entering the engine. A throttle plate orientation allowing a large flow rate of air to pass is associated with a high engine speed, rpm. A throttle plate orientation allowing a lower flow rate of air to pass is associated with a lower engine speed, rpm.

The intake valves are timed to open at the start of an intake stroke and close at the end of the intake stroke/start of the compression stroke. The exhaust valves are timed to open at the start of an exhaust stroke and close at the end of the exhaust stroke/start of the following intake stroke. However the timings of the intake and exhaust valves opening and closing can be made variable according to a variable valve lift control protocol as will be described in more detail below.

Figure 3:
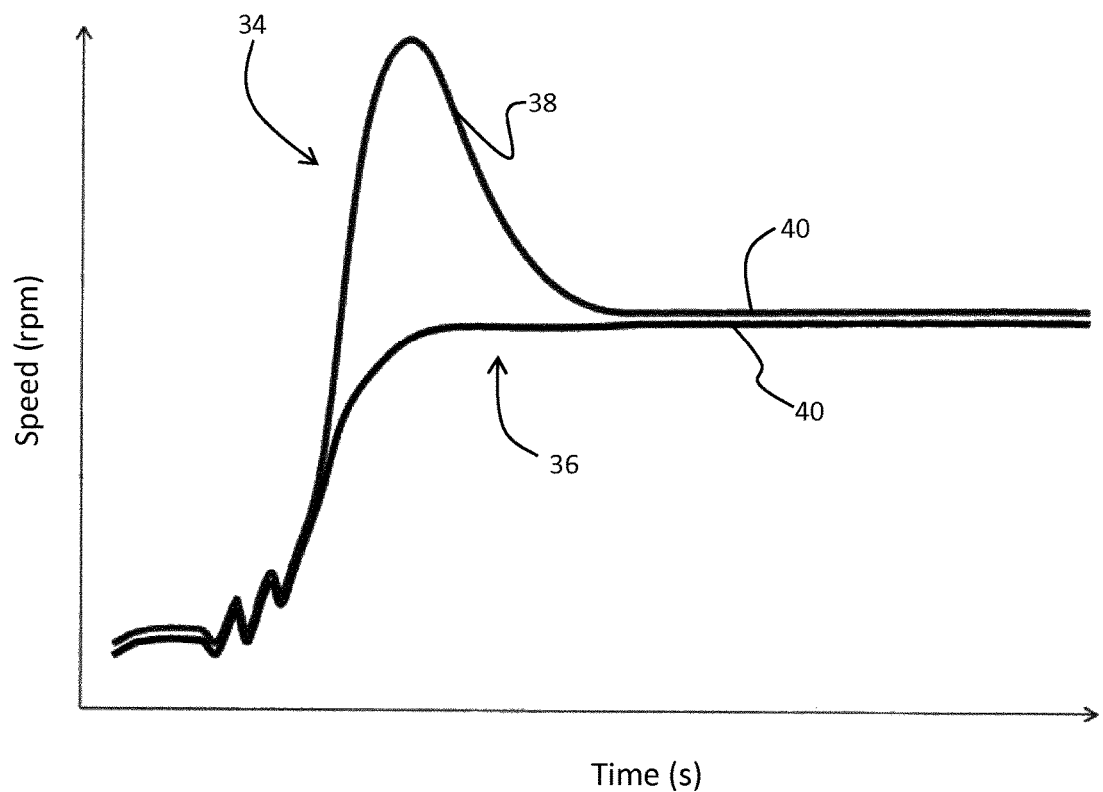
FIG. 3 shows a graphical representation of start profiles resulting from using the vehicle control unit from FIG. 1.

With reference to FIG. 3, the "sporty" profile 34 and the "refined" profile 36 are graphically presented in the form of engine speed (rpm) against time (s). In this way, the "sporty" profile 34 is a first profile and the "refined" profile 36 is a second profile. However, there may be more than two profiles which are selectable by a driver.

The "sporty" profile 34 includes an overshoot 38 in engine speed prior to idle speed 40. The peak speed of the overshoot 38 has a magnitude of four times greater than the idle speed 40. The idle speed 40 is approximately 800 rpm. The overshoot 38 is known as engine flare. An overshoot in engine speed is realised by opening the throttle plate transiently to a far greater angle of inclination than is required for idle speed 40 immediately followed by a change in throttle plate angle to one suitable for producing the idle speed 40. The engine flare can be calibrated by optimising the throttle plate orientation. The intake and exhaust valves can also be used to calibrate the profile of the engine flare 38.

In some but not necessarily all example of the present disclosure the rate at which the engine speed is reduced from the peak speed of the overshoot 38 to the idle speed 40 can be increased by switching on one or more ancillary loads such as, for example, an air conditioning system, a radio, windshield wipers, headlights.

The "refined" profile 36 includes no overshoot or engine flare and as such the engine flare 38 of the "sporty" profile 34 is greater than the engine flare of the "refined" profile. In fact, any flare of the "refined" profile has been suppressed to an extent that there is no flare present. The lower engine flare is achieved again by tuning the throttle plate orientation and movement. The intake and exhaust valves of the cylinders may also by calibrated in order to eliminate the engine flare.

The selection module 30 is also connected to the noise control module 32. The noise control module 30 is connected to a supplementary noise source 24 to control the noise therefrom. It is envisaged that the term "noise" encompasses volume, tone, coarseness, and pitch, as well as the degree of throatiness and raucousness. The supplementary noise source 24 is used to accentuate or attenuate further the noise corresponding to "sporty" or "refined" profiles of the engine. Specifically, the engine flare noise of the "sporty" or "refined" profiles can be accentuated or attenuated in this way. The supplementary noise source 24 can be any of a number of ancillary systems existing on the vehicle 10. In this way, the supplementary noise source 24 may include an infotainment system (FIG. 4), an active exhaust system (FIG. 5), and an active intake system (FIG. 6). The supplementary noise systems are described in more detail below.

Figure 4:
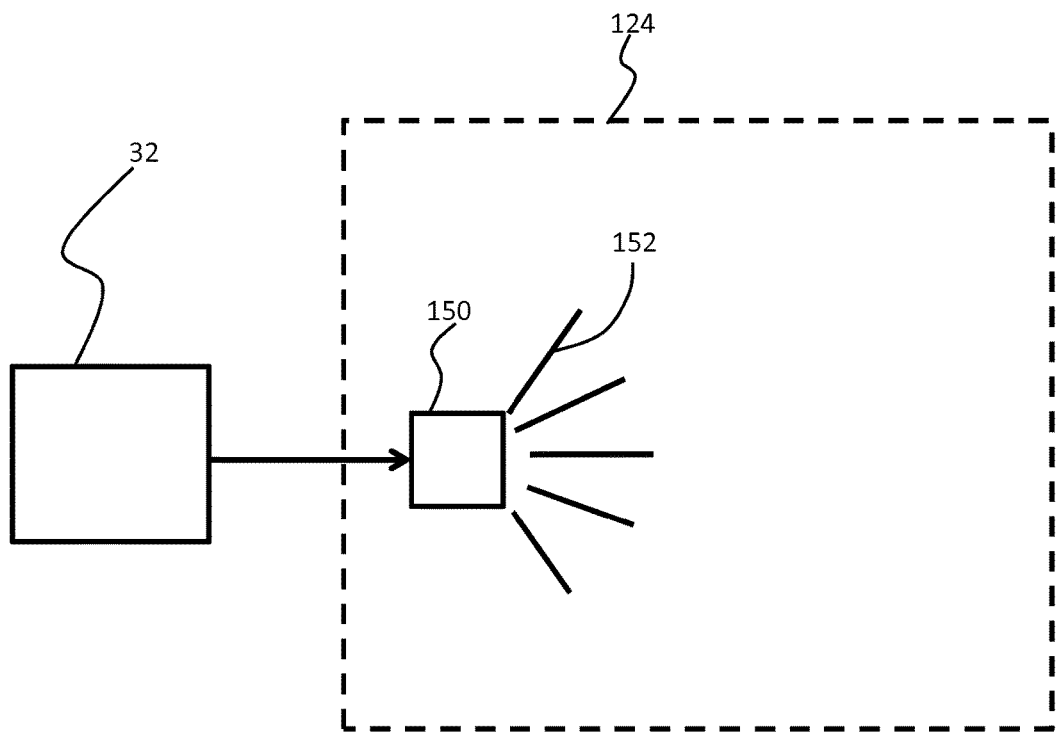
FIG. 4 shows a schematic of a supplementary noise control system from the vehicle control unit, in the form of an infotainment system.

With reference to FIG. 4, one possible supplementary noise source comprises an infotainment system 124. The infotainment system 124 includes a speaker 150. Where the "sporty" profile is selected, the infotainment system 124 is configured, by the vehicle control unit 20, to emit sound 152. The sound 152 produced by the speaker 150 can be of various forms including "pops" and "bangs" to replicate those noises sometimes emitted from the exhaust system during acceleration. Alternatively or additionally, the sound 152 can include a recording of engine revolutions or other engine noise enhancements indicating refined or sporty.

In addition, for the "refined" profile, the infotainment system 124 is configured, by the vehicle control unit 20, to emit sound 152 in the form of anti-noise. Anti-noise is sound having a frequency and phase shift arranged to cancel noise produced by the engine when flaring.

Figure 5:
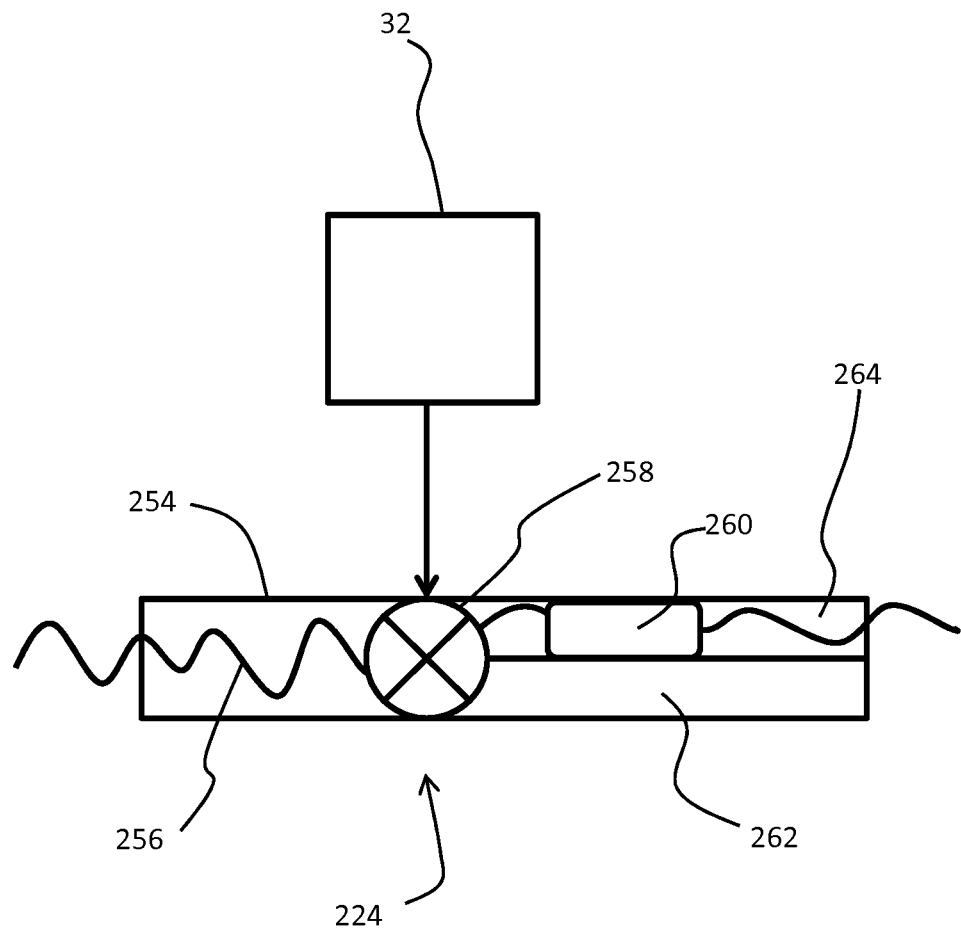
FIG. 5 shows a schematic of a supplementary noise control system from the vehicle control unit, in the form of an active exhaust system.
Figure 6:
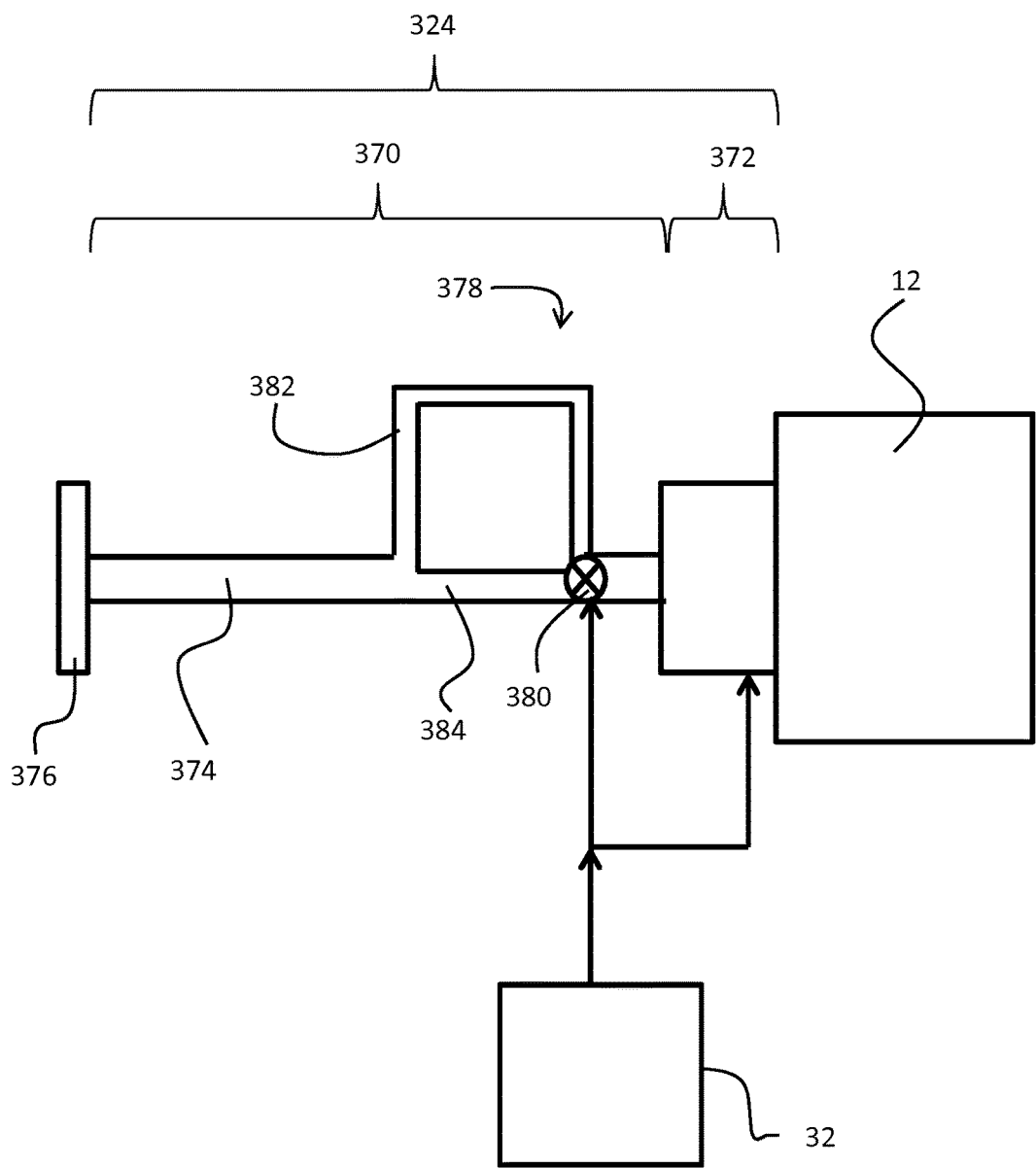
FIG. 6 shows a schematic of a supplementary noise control system from the vehicle control unit, in the form of an active intake system.

With reference to FIG. 5, another possible supplementary noise source comprises an active exhaust system 224. The active exhaust system 224 includes an exhaust pipe 254. The exhaust pipe 254 is used to transfer exhaust gas 256 from the engine 12 (FIG. 1) to the exterior environment of the vehicle. The active exhaust system 224 includes an active exhaust valve 258 situated within the exhaust pipe 254. Downstream of the active exhaust valve 258, the exhaust pipe 254 is bifurcated. The active exhaust system 224 also includes a suppressor 260 in one branch of the bifurcated portion of the exhaust pipe 254. The suppressor 260 is known in the art and is thus not described in any great detail here. A noisy branch 262 is provided by the branch not having the suppressor 260 since the exhaust pipe amplifies reverberations caused by the exhaust gas 256. A quiet branch 264 is provided by the branch having the suppressor 260 since the suppressor 260 attenuates noise resulting from reverberations caused by the exhaust air 256.

The active exhaust valve 258 is a ball valve having a normal position arranged to direct a relatively high proportion of exhaust gas 256 down the noisy branch 262. The active exhaust valve 258 also has a silenced position arranged to direct a relatively high proportion of exhaust gas 256 down the quiet branch 264 instead of the noisy branch 262. The active exhaust valve 258 is configured by the vehicle control unit 20 to transition between the normal and noisy positions depending on whether the "sporty" or the "refined" profile has been selected.

In addition, operation of an engine intake valve, engine exhaust valve, and valve lift can be controlled to induce noise away from the engine. In particular, fixed valve operation, variable valve timing and valve lift can be used to affect the transmission of exhaust noise back through an induction system of the vehicle. Also, opening the engine exhaust valve early creates combustion whilst the exhaust valve is already open resulting in combustion taking place within the exhaust pipe 254. When combined with a late spark, the combustion within the exhaust pipe 254 results in various acoustic effects such as "pops" and "bangs". These acoustic effects can be used to exaggerate the flare of the "sporty" profile. Conversely, the opposite of the above will result in a "refined" profile.

With reference to FIG. 6, the supplementary noise source comprises an active intake system 324. The active intake system 324 includes an active induction system 370 and an active inlet manifold 372.

The active induction system 370 includes a primary pipe 374 extending downstream from an air filter 376. The active induction system 370 also includes a symposer 378 downstream of the primary pipe 374. The symposer 378 includes a relatively long duct 382 and a relatively short duct 384 in direct fluid communication with the primary pipe 374. The symposer 378 also includes an active intake valve 380 positioned downstream from both the long and short ducts 382, 384 at entry to the active inlet manifold 372. The active intake valve 380 is again a ball valve being controllable by the noise control module 32. In a noisy configuration, the active intake valve 380 directs intake air through the relatively long duct 382. The relatively long duct allows a relatively high degree of engine noise to propagate upstream when the cylinder inlet valves and the throttle plate open. In a quiet configuration, the active intake valve 382 directs intake air through the relatively short duct 384. The relatively short duct 384 allows a lower amount of engine noise to propagate upstream than the relatively long duct 382, due to its increased length of the long duct 382. It is possible to control upstream engine noise propagation by including ducts of different diameters as an alternative or in addition to the change in length between the ducts. Other configurations are also possible provided that there is a relatively noise duct and a relatively quiet duct.

Furthermore, a tachometer can be recalibrated to artificially give the impression of varying amounts of engine flare in addition to the aforementioned noise systems.

The vehicle control system is best described with reference to various scenarios of operation.

In one scenario, a enthusiastic driver is intending to the drive the vehicle 10 (FIG. 1). The vehicle 10 is located in a built up area in the middle of the day where there is copious ambient noise. The enthusiastic driver selects manually, using a touch screen on the dashboard, the "sporty" profile. The selection module determines that the "sporty" profile is appropriate for use since an engine flare will not cause unsatisfactory noise pollution nor unduly startle neither passers-by nor the driver. The driver presses the start switch 18. The engine control unit 22 configures the engine to flare 38 prior to idle speed 40 (FIG. 3).

In parallel to the engine 12 operating in accordance with the "sporty" profile, the noise control unit 20 configures one or more of the supplementary noise sources 24 to accentuate the noise of the engine flare. In particular, the infotainment system 124 is configured to produce acoustic effects simulating mechanical noises relating to the engine at engine start. Specifically, the infotainment system emits sound 152 simulating "pops" and "bangs" together with a simulated engine flare. Additionally, the active exhaust system 224 is configured, by the noise control module 32, to set the active exhaust valve 258 to a noisy configuration and direct a relatively large proportion of exhaust gas 256 down the noisy branch 262 and not down the suppressor 260. To create further noise, the engine valves and spark timings are adjusted to causes acoustic effects, such as "pops" and "bangs" within the exhaust pipe 254.

The active intake system 324 is also set to produce noise by the noise control module 32. Specifically, the active intake valve 380 is configured to allow the intake air to flow through the long duct 382 and blocks air from flowing through the short duct 384. In this way, engine noise is allowed to propagate upstream.

In another scenario, the enthusiastic driver again intends to drive the vehicle 10 (FIG. 1). This time, the vehicle is about to be driven at night in a built up area with little ambient noise. The selection module 30 determines that the engine flare 38 of the "sporty" profile 34 (FIG. 3) is not appropriate and prevents the enthusiastic driver from selecting it. Instead, the "sporty" profile is automatically overridden by the selection module 30. At engine start, no engine flare is present and the engine speed transitions directly to idle speed 40 (FIG. 3).

The noise control module 32 configures the infotainment system 124 to emit anti-noise to counteract the engine noise (FIG. 4). In addition, active exhaust valve 258 is configured to direct the exhaust air 256 through the suppressor 260 (FIG. 5). Also, the engine inlet valves are configured to open in concert with the start of the intake stroke meaning that a fuel to air ratio is optimised and combustion thus takes place entirely within the cylinders as opposed to occurring briefly within the exhaust pipe. Finally, the symposer 378 is configured such that the active intake valve 380 directs the intake air through the short duct 384 as opposed to the long duct 382 so as to reduce the engine noise propagating upstream from the engine 12 (FIG. 6).

In a further scenario, an relaxed driver intends to drive the vehicle 10 (FIG. 1). The driver manually selects the "refined" profile using the touchscreen. The selection module 30 allows the "sporty" profile to be over-ridden since very few situations exist where a "refined" profile would be startling for either the vehicle occupants or passers-by. In this case, the control module operates in the same way as the previous scenario.

The invention claimed is:

1. A control unit for a vehicle comprising:
   an input for detecting an engine start demand corresponding to a driver intent to drive the vehicle from a standstill;
   a selection module arranged to select between a first engine start profile and a second engine start profile in dependence on a monitored condition occurring when detecting the engine start demand, wherein the first engine start profile has a higher magnitude of engine speed overshoot prior to idle than the second engine start profile and the second engine start profile has a suppressed flare prior to idle, wherein the idle exists before a launch of the vehicle; and
   a control module arranged to control an engine start attribute according to the first engine start profile or the second engine start profile, in response to detection of the engine start demand.

2. The control unit of claim 1, wherein at least one of the first engine start profile and the second engine start profile is customizable by an end user.

3. The control unit of claim 1, comprising a noise control module to control a supplementary noise source of the vehicle to accentuate or attenuate at least one of a flare of the first engine start profile and the flare of the second engine start profile.

4. The control unit of claim 3, wherein the supplementary noise source comprises an infotainment system comprising a speaker, the infotainment system arranged to emit additional noise in response to the first engine start profile being selected and to emit anti-noise in response to the second engine start profile being selected.

5. The control unit of claim 3, wherein the supplementary noise source comprises an exhaust system.

6. The control unit of claim 5, wherein the noise control module is arranged to configure an active exhaust valve of the exhaust system to direct a relatively high proportion of exhaust gas to flow through a suppressor in response to selecting the second engine start profile, and to direct a relatively low proportion of exhaust gas to flow through the suppressor in response to selecting the first engine start profile.

7. The control unit of claim 5, wherein the noise control module is arranged to configure one or more engine controllable elements to induce noise upstream through an induction system or downstream through an exhaust system, wherein said controllable elements are selected from an engine intake valve, an engine exhaust valve, and a spark plug.

8. The control unit of claim 3, wherein the supplementary noise source comprises an active intake system.

9. The control unit of claim 8, wherein the active intake system comprises an active induction system.

10. The control unit of claim 9, wherein the active induction system comprises a symposer for diverting induced airflow into two ducts each having different geometry to control engine noise allowed to propagate from an engine.

11. The control unit of claim 8, wherein the active intake system comprises an active inlet manifold.

12. The control unit of claim 3, wherein the supplementary noise source comprises a tachometer.

13. The control unit of claim 1, wherein the first engine start profile is defined as a default profile, and the selection module is arranged to over-ride the first engine start profile with the second engine start profile.

14. The control unit of claim 1, wherein the selection module is arranged to select the profile automatically in response to sensing the condition.

15. The control unit of claim 14, wherein the condition includes at least one of a time of day, a date, driver identification, vehicle location, ambient noise, and a throttle pedal actuation profile.

16. The control unit of claim 1, comprising a profile selector and wherein the condition includes a manual selection input by a vehicle occupant using the profile selector.

17. The control unit of claim 16, wherein the profile selector includes a touch screen.

18. A vehicle including the control unit of claim 1.

19. A method of controlling a vehicle attribute, the method comprising:
   detecting an engine start demand corresponding to a driver intent to drive the vehicle from a standstill;
   monitoring a condition associated with detecting the engine start demand;
   selecting between a first engine start profile and a second engine start profile in dependence on the monitored condition, wherein the first engine start profile has a higher magnitude of engine speed overshoot prior to idle than the second engine start profile and the second engine start profile has a suppressed flare prior to idle; and
   configuring an engine start attribute according to selecting the first engine start profile or the second engine start profile in response to detecting the engine start demand.

20. A control unit for a vehicle, comprising:
   an input for detecting an engine start demand corresponding to a driver intent to drive the vehicle from a standstill and a condition associated with detecting the engine start demand;
   a selection module arranged to select a first engine start profile when detecting the engine start demand at a first time of day and a second engine start profile when detecting the engine start demand at a second time of day that is different than the first time of day; and
   a control module arranged to control an engine start attribute according to the selected one of the first engine start profile or the second engine start profile in response to detection of the engine start demand.

21. The control unit of claim 20, wherein
   the first time of day is within a first range of hours; and
   the second time of day is within a second range of hours.

* * * * *